United States Patent [19]
Chikuma

[11] Patent Number: 5,863,495
[45] Date of Patent: Jan. 26, 1999

[54] HYDROGEN NUCLEUS STORAGE METHOD AND HYDROGEN NUCLEUS STORAGE UNIT

[76] Inventor: Toichi Chikuma, 11-9-703, Sendagaya 4-chome, Shibuya-ku, Tokyo, Japan

[21] Appl. No.: 88,487

[22] Filed: Jun. 2, 1998

Related U.S. Application Data

[62] Division of Ser. No. 708,318, Sep. 5, 1996, Pat. No. 5,792,443.

[30] Foreign Application Priority Data

Sep. 26, 1995 [JP] Japan ................................. 7-270690

[51] Int. Cl.$^6$ ................................ C01B 6/24; C01B 4/00
[52] U.S. Cl. .................... 420/900; 423/647.7; 423/658.2
[58] Field of Search ............................. 423/647.7, 648.1, 423/658.2; 376/100, 146; 205/627, 628; 420/900

[56] References Cited

FOREIGN PATENT DOCUMENTS

| 3-69501 | 3/1991 | Japan . |
| 6148366 | 5/1994 | Japan ............................. G21B 1/00 |
| 7-101701 | 4/1995 | Japan . |

OTHER PUBLICATIONS

The Washington Times, p. A5, article by D. Braaten, Mar. 24, 1989.
The New York Times, pp. A1, A22, article by M. Browne, May 3, 1989.
J. Electroanal, Chem., vol. 266 (1989), pp. 437–450, Kreysa et al.
Journal of Nuclear Science and Technology, vol. 26, No. 7, pp. 729–732, Ohashi et al., Jul. 1, 1989.
Science, vol. 246, No. 4931, pp. 793–796, Miskelly et al., Nov. 10, 1989.
Nature, vol. 340, pp. 525–530, Lewis et al., Aug. 17, 1989.
UCRL—101583, Cold Confusion, pp. 1–9, Chapline, Jul. 1, 1989.
The Wall Street Journal, p. B4, article by D. Stipp, Apr. 26, 1989.
The Washington Post, pp. A1, A7, article by P. Hilts, May 2, 1989.
The Washington Post, p. A14, Associated Press, Jul. 13, 1989.
Z. Phys. A.—Atomic Nuclei, vol. 333, pp. 319–320, Alber et al., 1989.
ORNL/FTR–3341, pp. 2–15, Cooke, Jul. 31, 1989.
J. Radioanal. Nucl. Chem., Letters, vol. 137, No. 1, pp. 23–28, Horanyi, Aug. 21, 1989.
J. Radioanal. Nucl. Chem., Letters, vol. 137, No. 1, pp. 9–16, Faller et al., Aug. 21, 1989.
Solid State Communications, vol. 72, No. 4, pp. 309–313, Hajdas et al., 1989.
Physical Review Letters, vol. 62, No. 25, pp. 2929–2932, Ziegler et al., Jun. 19, 1989.

(List continued on next page.)

*Primary Examiner*—Charles T. Jordan
*Assistant Examiner*—Matthew J. Lattig
*Attorney, Agent, or Firm*—Sughrue, Mion, Zinn, Macpeak & Seas, PLLC

[57] ABSTRACT

The invention provides a hydrogen nucleus storage method and a hydrogen nucleus storage unit wherein occlusion of hydrogen nuclei and transition into a storage condition after the occlusion can be performed simply and the utilization efficiency of a material which causes cold nuclear fusion to occur is high. A hydrogen occlusion member coated in advance with an insulation layer capable of preventing penetration of hydrogen nuclei therethrough is inserted, only at a portion thereof which is not coated with the insulation layer, into a reactor vessel so that hydrogen nuclei are occluded into the hydrogen occlusion member, and then the portion of the hydrogen occlusion member is removed from the reactor vessel. Thereafter, also the portion which is not coated with the insulation layer is coated with an insulation layer, and the hydrogen occlusion member is accommodated into and kept in a protective case in accordance with the necessity.

2 Claims, 3 Drawing Sheets

OTHER PUBLICATIONS

Z. Phys. B., Condensed Matter, vol. 76, No. 2, pp. 141–142, Schrieder et al., 1989.

Physical Review Letters, vol. 63, No. 18, pp. 1926–1929, Price et al., Oct. 30, 1989.

Physical Letters B, vol. 228, No. 1, pp. 163–166, Cribier et al., Sep. 7, 1989.

Solid State communications, vol. 72, No. 1, pp. 53–57, Shani et al., 1989.

The Washington Post, p. A3, Associated Press, Mar. 29, 1990.

Nature, vol. 344, pp. 401–405, Salamon et al., Mar. 29, 1990.

HYDROGEN NUCLEUS STORAGE METHOD AND HYDROGEN NUCLEUS STORAGE UNIT

This is a divisional application of application Ser. No. 08/708,318 filed Sep. 5, 1996.

BACKGROUND OF THE INVENTION

1. Field of the Invention

This invention relates to a hydrogen nucleus storage method and a hydrogen nuclei storage unit for storing or keeping hydrogen nuclei occluded in a hydrogen occlusion member.

2. Description of the Related Art

Although cold nuclear fusion which is a phenomenon wherein a nuclear fusion reaction occurs when atomic nuclei of deuterium or hydrogen are successively occluded into a hydrogen occlusion member such as palladium in a reactor vessel exhibits difficulty in actual proof of the reproducibility, much effort has been and is being directed to research and development of the cold nuclear fusion technique. From various publications until now, it can be seen that the research and development in this field has been directed principally to occlusion of atomic nuclei of deuterium or hydrogen into a hydrogen occlusion member and, under present conditions, is not directed to utilization or application of a hydrogen occlusion member after such occlusion.

As a technique which takes note of a hydrogen occlusion member after occlusion, a method of occluding and confining deuterium into and in a deuterium occlusion metal is disclosed in Japanese Patent Laid-Open Application No. Heisei 6-148366. According to the method mentioned, an entire block of a deuterium occlusion metal such as a Pd alloy or Ti is soaked in electrolytic solution of an electrolytic cell and electrolysis of heavy water is performed using the deuterium occlusion metal block as a cathode so as to occlude deuterium into the cathode, and then a barrier layer of Hg, Au, Ag, Cu, Sn, In, Zn or the like which does not penetrate deuterium therethrough is formed on the surface of the cathode by electrolytic or electroless plating in order to keep the hydrogen occlusion condition.

However, where the method is employed, after the entire block of the hydrogen occlusion metal is soaked into the electrolytic solution and electrolysis of heavy water is performed to occlude deuterium (more accurately, to occlude atomic nuclei of deuterium) into the deuterium occlusion member, Hg ions or like ions are added directly to the heavy water and then a barrier layer is formed by electrolysis. Accordingly, although occlusion of deuterium and formation of a barrier layer can be performed in the same electrolytic cell, the method described above is disadvantageous in that it is difficult to form an intended barrier layer, that the heavy water cannot be used repetitively because Hg ions and so forth are added after each occlusion operation and that, even if repetitive use of the heavy water is possible, processing for removing the additive is required in order to allow such re-utilization and consequently the utilization efficiency of the heavy water is low.

SUMMARY OF THE INVENTION

It is an object of the present invention to provide a hydrogen nucleus storage method and a hydrogen nucleus storage unit wherein occlusion of hydrogen nuclei and transition into a storage condition after the occlusion can be performed simply.

In order to attain the object described above, according to an aspect of the present invention, there is provided a hydrogen nucleus storage method, comprising the steps of inserting only that portion of a hydrogen occlusion member coated in advance with an insulation layer capable of preventing penetration of hydrogen nuclei therethrough which is not coated with the insulation layer into a reactor vessel so that hydrogen nuclei are occluded into the hydrogen occlusion member, and removing the portion of the hydrogen occlusion member from the reactor vessel.

In the hydrogen nucleus storage method, a hydrogen occlusion member coated in advance with an insulation layer capable of preventing penetration of hydrogen nuclei therethrough is inserted, only at a portion thereof which is not coated with the insulation layer, into a reactor vessel so that hydrogen nuclei are occluded into the hydrogen occlusion member, and then the portion of the hydrogen occlusion member is removed from the reactor vessel. Consequently, occlusion of hydrogen nuclei and transition to a storing condition after the occlusion can be performed readily comparing with conventional methods.

The hydrogen nucleus storage method may further comprise the step of coating, after the portion of the hydrogen occlusion member is removed from the reactor vessel, an insulation layer on the portion of the hydrogen occlusion member which is not coated with the insulation layer. The hydrogen nucleus storage method may further comprise the step of accommodating and keeping the hydrogen occlusion member coated with the insulation layers into and in a protective case. Since the portion which is not coated with the insulation layer is coated with an insulation layer and the hydrogen occlusion member is accommodated into and kept in a protective case in accordance with the necessity.

According to another aspect of the present invention, there is provided a hydrogen nucleus storage unit, comprising a hydrogen occlusion member in which hydrogen nuclei are occluded, a coating electrode coated on the hydrogen occlusion member, a protective case for accommodating the hydrogen occlusion member, and a potential generator accommodated in the protective case for generating a potential to be applied to the hydrogen occlusion member using the coating electrode as a positive electrode.

Preferably, the coating electrode is made of a metal capable of preventing penetration of hydrogen nuclei therethrough.

In the hydrogen nucleus storage unit, since the hydrogen occlusion member in which hydrogen nuclei are occluded is coated with the coating electrode and the hydrogen occlusion member is accommodated in the protective case together with the potential generator which generates a potential using the coating electrode as a positive electrode, the hydrogen nucleus storage unit can be conveyed while keeping its hydrogen nucleus storing condition. Where the coating electrode is made of a metal which is capable of preventing penetration of hydrogen nuclei therethrough, confinement of hydrogen nuclei can be performed with a higher degree of certainty.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1A:
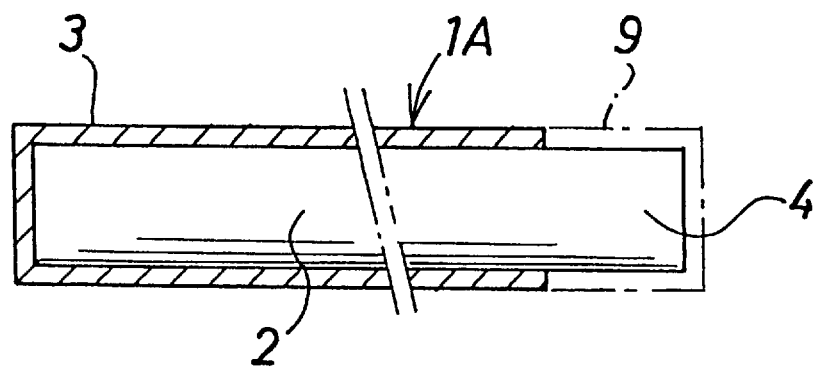
FIGS. 1(A) and 1(B) are schematic sectional views showing different hydrogen occlusion members used in a method of the present invention wherein a coating electrode is not coated on only one or any of the opposite end portions of a hydrogen occlusion material.
Figure 1B:
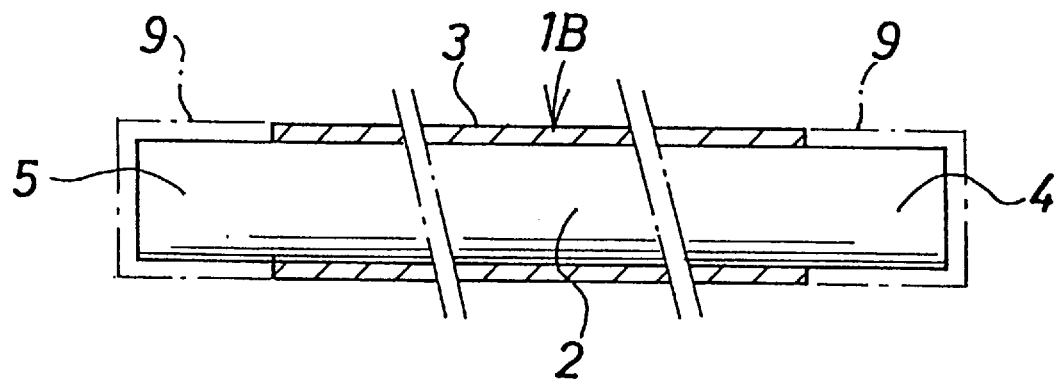

Referring to FIGS. 1(A) and 1(B), there are shown different hydrogen occlusion members before they are put into a condition wherein hydrogen nuclei are occluded and stored therein. The hydrogen occlusion members shown in FIGS. 1(A) and 1(B) are generally denoted at 1A and 1B, respectively, and are used to perform the hydrogen nucleus storage method of the present invention.

The hydrogen occlusion member 1A shown in FIG. 1(A) includes a bar-like hydrogen occlusion element 2 made of a metal having a hydrogen occluding property such as Pd or an alloy of Pd for occluding atomic nuclei of deuterium or hydrogen, and a coating electrode or insulation layer 3 of a metal coated in advance on the surface of the hydrogen occlusion element 2 except an end portion 4 thereof and having a property of preventing penetration of hydrogen nuclei such as Cu or Au.

Meanwhile, the hydrogen occlusion member 1B shown in FIG. 1(B) is similar in construction to the hydrogen occlusion member 1A shown in FIG. 1(A) except that it is coated with the coating electrode 3 not except the one end portion 4 but except the opposite end portions 4 and 5 thereof.

Figure 2:
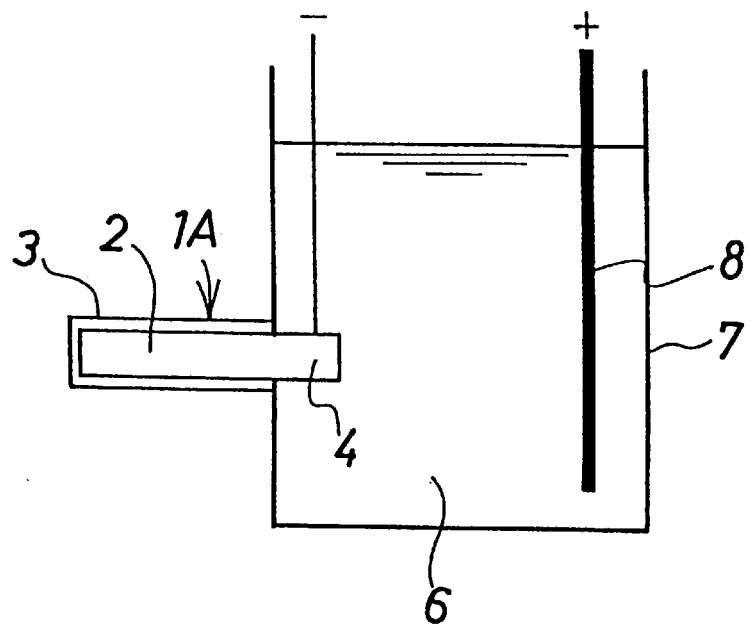
FIG. 2 is a schematic view illustrating a method of occluding deuterium nuclei into the hydrogen occlusion member of FIG. 1(A)

FIG. 2 illustrates a method of occluding deuterium nuclei into the hydrogen occlusion member 1A shown in FIG. 1(A). Referring to FIG. 2, a single electrolytic cell 7 in which heavy water 6 is accommodated is used as a reactor vessel, and only the end portion 4 of the hydrogen occlusion element 2 which is not coated with the coating electrode 3 is inserted in the electrolytic cell 7 and is used as a cathode. Then, a dc voltage or a pulse voltage is applied between the cathode and an anode 8 made of a metal such as platinum (Pt) to electrolyze the heavy water 6. As a result of the electrolysis, deuterium nuclei in the heavy water 6 are occluded into the hydrogen occlusion element 2 through the end portion 4 of the hydrogen occlusion element 2.

After deuterium nuclei are occluded for a certain period of time in this manner, the end portion 4 of the hydrogen occlusion member 1A is removed from the electrolytic cell 7 and immediately capped with a cap 9 made of a same material as that of the coating electrode 3 as seen in FIG. 1(A) to cover the entire surface of the hydrogen occlusion element 2.

Figure 3:
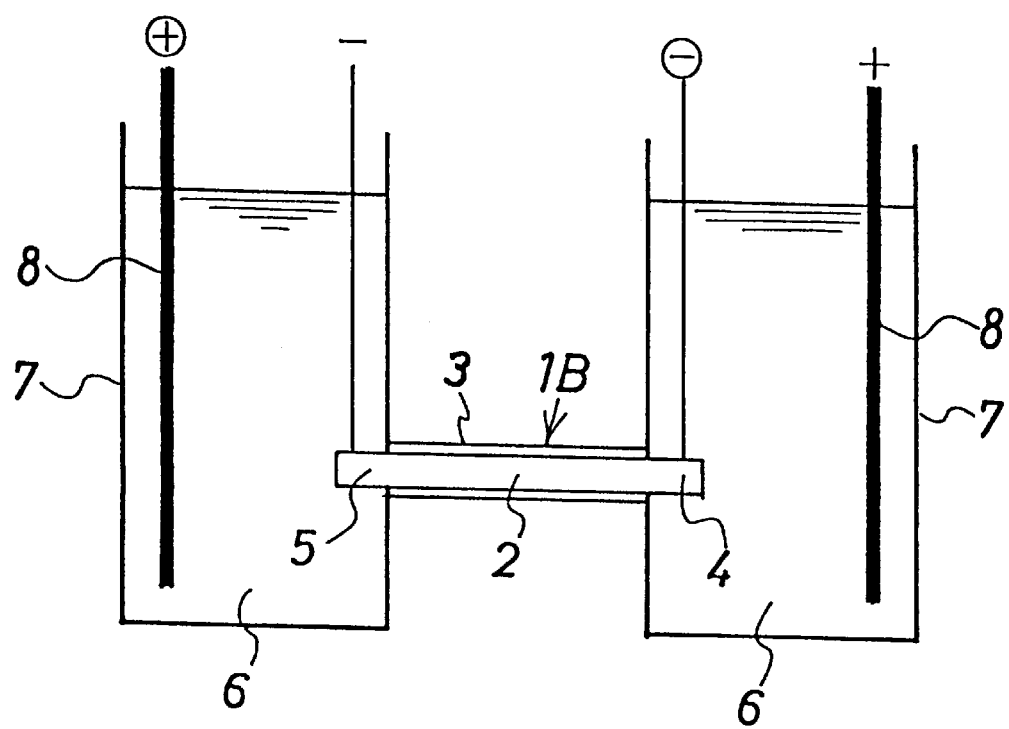
FIG. 3 is a schematic view illustrating a method of occluding deuterium nuclei into the hydrogen occlusion member of FIG. 1(B)

Referring now to FIG. 3, there is illustrated a method of occluding deuterium nuclei into the hydrogen occlusion member 1B shown in FIG. 1(B). In the present method, two electrolytic cells 7 in which heavy water 6 is accommodated are used, and the opposite end portions 4 and 5 of the hydrogen occlusion element 2 which are not coated with the coating electrode 3 are inserted in the two electrolytic cells 7 such that they are used as a common anode to the electrolytic cells 7. An anode 8 is disposed in each of the electrolytic cells 7. A dc voltage or a pulse voltage is applied between the anode 8 in the electrolytic cell 7 shown on the left side in FIG. 3 and the right end portion 4 of the hydrogen occlusion element 2 which is positioned in the electrolytic cell 7 on the right side in FIG. 3 while another dc voltage or another pulse voltage is applied between the anode 8 in the electrolytic cell 7 on the right side in FIG. 3 and the left end portion 5 of the hydrogen occlusion element 2 positioned in the electrolytic cell 7 on the left side in FIG. 3 so that deuterium nuclei are occluded at a time into the hydrogen occlusion element 2 through the opposite end portions 4 and 5 of the hydrogen occlusion element 2 in the two electrolytic cells 7.

After deuterium nuclei are occluded into the hydrogen occlusion element 2 simultaneously through the opposite sides for a required time in this manner, the opposite end portions 4 and 5 of the hydrogen occlusion member 1B are removed from the electrolytic cells 7 and are immediately capped with a pair of caps 9 made of a same material as that of the coating electrode 3 as seen in FIG. 1(B) to cover the entire surface of the hydrogen occlusion element 2 for insulation to establish a condition wherein the deuterium nuclei occluded in the hydrogen occlusion element 2 are confined in the hydrogen occlusion element 2.

Figure 4:
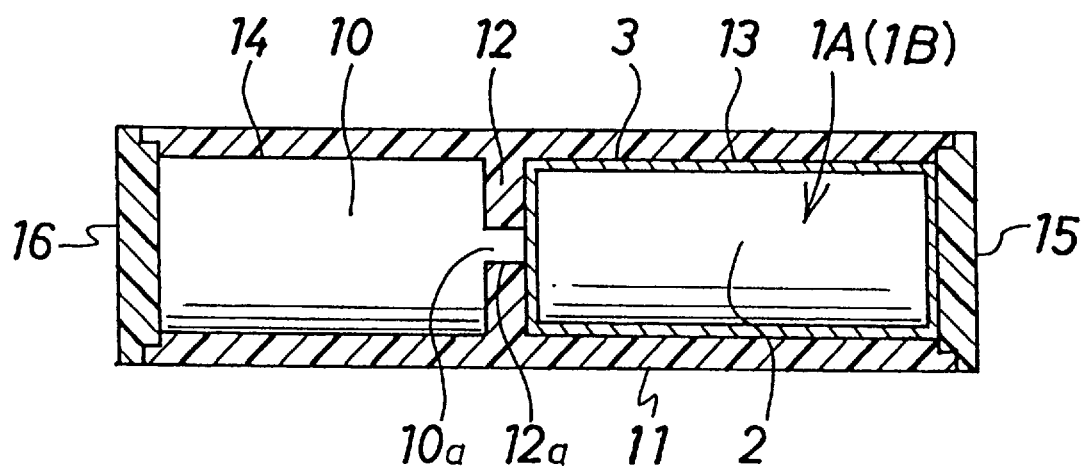
FIG. 4 is a schematic longitudinal sectional view showing a hydrogen nucleus storage unit according to the present invention.

FIG. 4 shows a hydrogen nucleus storage unit to which the present invention is applied. Referring to FIG. 4, the hydrogen nuclei storage unit shown is generally constructed such that the hydrogen occlusion member 1A or 1B including the hydrogen occlusion element 2 which has been coated over the entire surface thereof with hydrogen nuclei occluded therein in such a manner as described above is accommodated in a protective case 11, which has an electric insulating property, together with a potential generator 10. The inside of the protective case 11 is partitioned into two storage chambers 13 and 14 by a partition 12, and the hydrogen occlusion member 1A or 1B is removably accommodated in the storage chamber 13 by inserting the same into the first storage chamber 13 and closing up the first storage chamber 13 with a lid 15. Further, the potential generator 10 is removably accommodated in the storage chamber 14 by inserting the same into the second storage chamber 14 and closing up the storage chamber 14 with a lid 16. An output terminal 10a of the potential generator 10 extends through a through-hole 12a formed in the partition 12 to an outer face of the coating electrode 3 of the hydrogen occlusion member 1A or 1B so that a positive potential is normally applied from the potential generator 10 to the coating electrode 3.

Consequently, deuterium nuclei occluded in the hydrogen occlusion element 2 of the hydrogen occlusion member 1A or 1B are confined in the coating electrode 3 made of a metal which does not penetrate deuterium nuclei therethrough and accordingly acting as an insulation layer. Besides, the deuterium nuclei themselves have positive charge. Accordingly, the deuterium nuclei are confined positively in the coating electrode 3 by the Coulomb force acting between the deuterium nuclei and the coating electrode 3 to which the same positive potential is applied. In order to promote the confinement, the atmospheric pressure of the storage chamber 13 may be kept high.

Having now fully described the invention, it will be apparent to one of ordinary skill in the art that many changes and modifications can be made thereto without departing from the spirit and scope of the invention as set forth herein.

What is claimed is:

1. A hydrogen nucleus storage unit, comprising:

a hydrogen occlusion member in which hydrogen nuclei are occluded;

a coating electrode coated on said hydrogen occlusion member;

a protective case for accommodating said hydrogen occlusion member; and a potential generator accommodated in said protective case for generating a potential to be applied to said hydrogen occlusion member using said coating electrode as a positive electrode.

2. A hydrogen nucleus storage unit as claimed in claim 1, wherein said coating electrode is made of a metal capable of preventing penetration of hydrogen nuclei therethrough.

* * * * *